United States Patent [19]

Baylor

[11] 4,029,366
[45] June 14, 1977

[54] SEALED TRACK CHAIN JOINT

[75] Inventor: John Merlin Baylor, Bettendorf, Iowa

[73] Assignee: J. I. Case Company, Racine, Wis.

[22] Filed: June 24, 1976

[21] Appl. No.: 699,259

[52] U.S. Cl. .............................. 305/11; 277/93 R; 74/247

[51] Int. Cl.² ................... B62D 55/20; F16J 15/34

[58] Field of Search .................. 74/257, 256, 247; 305/11, 58 R, 58 PC; 277/92, 93, 95, 153, 224

[56] References Cited

UNITED STATES PATENTS

| | | | |
|---|---|---|---|
| 2,336,913 | 12/1943 | Albrecht | 74/257 |
| 2,911,840 | 11/1959 | Muller et al. | 74/256 |
| 3,244,457 | 4/1966 | Ross | 74/257 X |
| 3,336,086 | 8/1967 | Reinsma | 305/11 |
| 3,341,259 | 9/1967 | Schulz et al. | 305/11 |
| 3,526,441 | 9/1970 | Schulz | 305/11 |
| 3,560,059 | 2/1971 | Miyake | 305/11 |
| 3,595,572 | 7/1971 | Granda | 277/92 |
| 3,622,165 | 11/1971 | Hatch | 277/95 |
| 3,948,574 | 4/1976 | Baylor | 277/92 X |

Primary Examiner—Samuel Scott
Assistant Examiner—ALlan R. Burke
Attorney, Agent, or Firm—Arthur J. Hansmann

[57] ABSTRACT

A sealed track chain joint with a track pin and a bushing extending thereover, and a link on the pin and a link on the bushing. An elastomeric seal extends between the pin and the bushing to seal against entry of dirt and exit of lubricant between the pin and bushing. The seal is anchored at opposite ends to the pin and the bushing, and it is torsionally flexible therebetween.

9 Claims, 5 Drawing Figures

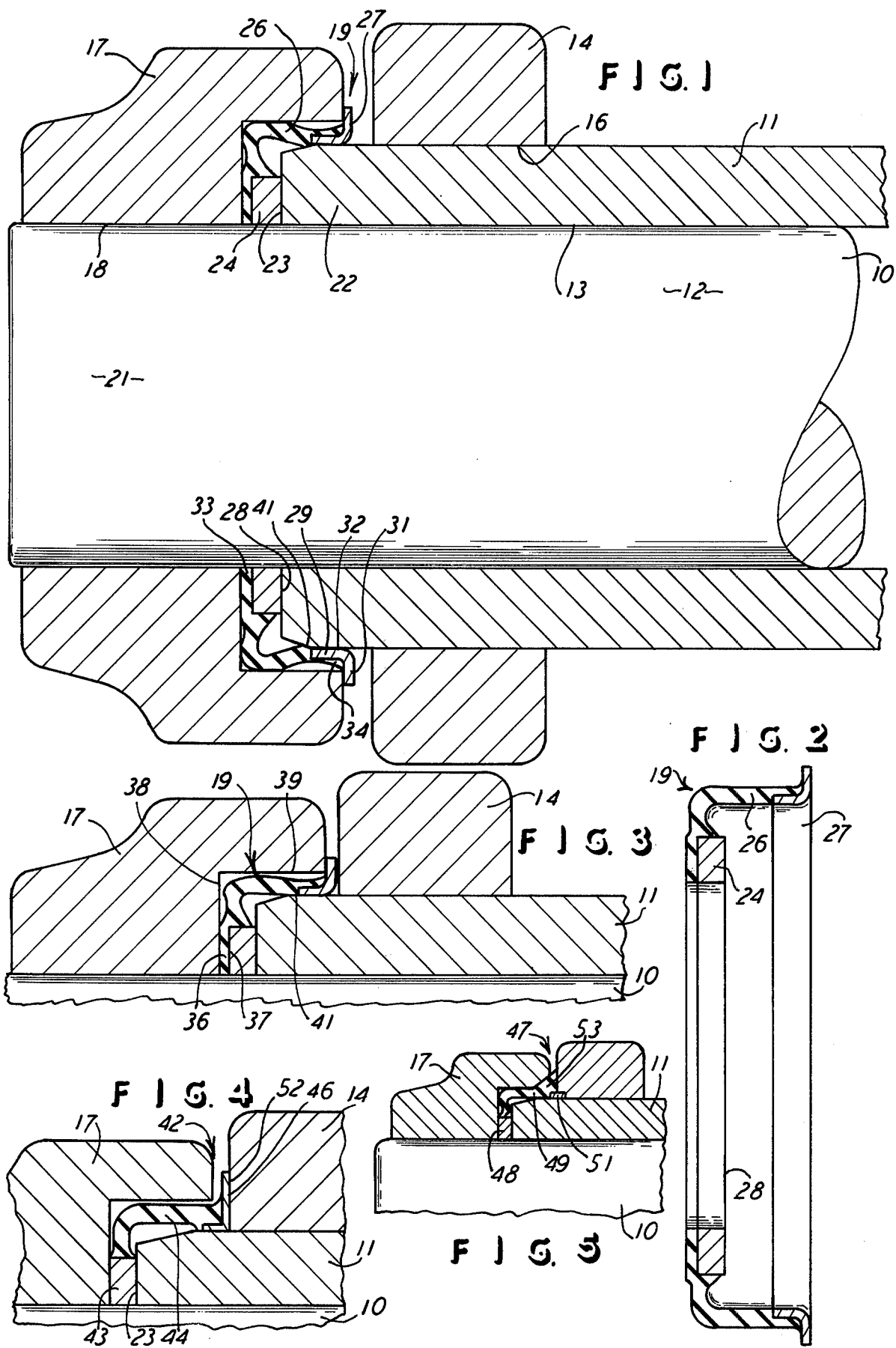

SEALED TRACK CHAIN JOINT

This invention relates to a sealed track chain joint, and, more particularly, it relates to a sealed joint for a track chain for the type used in a crawler tractor.

BACKGROUND OF THE INVENTION

The prior art is already aware of various configurations and arrangements of seals for track chains, and like assemblies. These assemblies are commonly known and used in connection with track chains for crawler-type tractors, and the chains have the usual pins and bushings and links. The concern and problem with these assemblies is to seal against the entry of dirt between the moving parts of the chain, and to also seal against the exit of lubricant. Examples of these track chains are shown in U.S. Pat. Nos. 2,911,840 and 3,336,086 and 3,347,602 and 3,595,572 and 3,622,165 and 3,680,924 and 3,731,551. The aforementioned all show the crawler type of track chain and they show elastomeric types of seals employed in the chains. Also, U.S. Pat. No. 3,341,259 shows a crawler type of track chain with an elastomeric seal having annular or ring members on each end of the seal. However, the overall arrangement, and also the particular configuration and arrangement of the seal itself, is patentably distinguishable from the arrangement and seal disclosed herein. The aforementioned is true since the arrangement in the present invention is such that the seal is effective between the bushing and the pin, to thereby fully and completely seal against the entry of dirt and the exit of lubricant between the bushing and chain pin.

Further disclosures of prior assemblies and seals as related to track chains are shown in my U.S. Pat. No. 3,948,574 and in my U.S. patent application Ser. No. 618,438, filed Oct. 1, 1975 and entitled "Sealed Track Joint".

Accordingly, the present invention provides a sealed track chain joint which is a general improvement upon the prior art and which provides a complete and positive seal between the track chain pin and the bushing thereon, such that the surfaces between the pin and bushing are completely and positively sealed.

Further, it is an object of this invention to provide a sealed track chain joint which incorporates an elastomeric member which is capable of flexing, including a torsional type of flexing on the cylindrically-shaped elastomeric member itself, to permit the pin and bushing of the chain to rotate relative to each other in the normal manner and in the normal use of the track chain, all while the seal serves its desired function of excluding the dirt and preventing the escape of lubricant from the joint.

Still further, the present invention provides a sealed track chain joint which utilizes a thrust washer, as a part of the seal itself, and the thrust washer is disclosed as being press-fitted onto the pin and provides the thrust bearing surface for the end surface of the bushing which is rotatable on the pin. With this arrangement, the seal is fully and positively effective as a seal, and the thrust bearing washer is available for alignment of the members of the track chain, such as the bushing itself and the link which is piloted on the bushing. Also, the present invention provides the sealed track chain joint with a ring press-fitted onto the bushing, and with an elastomeric portion of the seal extending between the thrust washer and the ring and to thereby positively prevent a seal between the pin and the bushing so that no dirt can enter therebetween and no lubricant can escape therefrom.

Still further, the present invention provides a sealed track chain joint which can be readily adapted to most standard track chain assemblies, and the seal itself is simply located in a counterbore in one of the track chain links, and it extends to the bushing rotatable on the pin on which the bushing is piloted. Accordingly, the track chain joint of this invention can be readily and easily adapted to most standard chain assemblies with only a minor, if any, modification of the standard assembly.

Other objects and advantages will become apparent upon reading the following description in light of the accompanying drawings.

BRIEF DESCRIPTION OF THE DRAWINGS

FIG. 1 is a longitudinal sectional view showing a fragment of a track chain with a preferred embodiment of the track chain joint of this invention.

FIG. 2 is a longitudinal sectional view of the seal shown in FIG. 1, and showing it in its unassembled condition.

FIG. 3 is a fragment of a sealed track chain joint similar to FIG. 1, but showing another embodiment thereof.

FIG. 4 is a sectional view of still another embodiment of the sealed track chain joint of this invention.

FIG. 5 is a longitudinal sectional view of a fragment of still another embodiment of a sealed track chain joint of this invention.

DETAILED DESCRIPTION OF THE PREFERRED EMBODIMENT

The drawings show, and the invention herein is related to, a track chain which is useful in a crawler type of tractor, as mentioned above. This type of track chain, and the crawler tractor on which it is employed, is shown in the aforementioned U.S. patents. Accordingly, the track chain referred to includes a cylindrical pin 10 and a tubularly-shaped or cylindrically-shaped bushing 11 which extends over the intermediate portion designated 12 of the pin 10, and the pin 10 and the bushing 11 are relatively rotatable about their common longitudinal axis which would of course extend for the length of the pin 10 and the bushing 11. As such, the pin 10 and bushing 11 have bearing or interengaging surfaces along the line designated 13, and it is this joint or portion 13 which is to be protected against the entry of dirt and the escape or exit of lubricant which may be applied to that zone or joint 13.

Also in the common arrangement, a track chain link 14 is press-fitted onto the bushing 11, along the mating surfaces designated by the line 16. Further, another track chain link 17 is press-fitted into the assembly and actually onto the pin 10, so that the link 17 and pin 10 are press-fitted together along the mating surfaces designated by the line 18. Accordingly, with this arrangement, the links 14 and 17 will articulate relative to each other when the pin 10 and bushing 11 rotate or pivot relative to each other about the longitudinal common axis of the pin 10 and bushing 11. This same arrangement of parts and press-fit of assembly is also true with regard to the track chain assemblies shown in FIGS. 3 and 4 and 5.

The drawings also show a seal, generally designated 19, effective between the end 21 of the pin 10 and the end designated 22 of the bushing 11. Of course, as will be readily understood by one skilled in the art, only the very left end of the track joint is shown in the drawings, and there would be a symmetrically-arranged right end having another seal 19 on the unshown right end of the pin 10, all so that the entire interengaged surfaces between the pin 10 and the bushing 11, for the entire length of the bushing 11, and as designated by the line or surface 13, would be protected by the seals 19. Accordingly, the bushing has an end surface 23 which is on a plane coincident with the very end of the bushing 11 and along the surface or line designated 23, and the pin intermediate portion 12 is therefore that length of the pin which extends between the two bushing end surfaces 23, the left end surface 23 being the only one shown in the drawings, as mentioned above.

The seal 19 is shown in FIGS. 1, 2, and 3, and it consists of a metal cylindrical washer 24, and an elastomeric cylindrically-shaped member 26, and a cylindrical ring 27. All three members are suitably bonded together, such as by heat or by suitable adhesives. The washer 24 is press-fitted onto the pin 10, to be fixed therewith and to thereby be in a permanent and set position on the pin 10 and of course to extend radially therefrom and thus to be in abutment with the bushing end surface 23, as shown in FIGS. 1 and 3. As such, the washer 24 is a thrust washer, and the bushing end surface 23 thus is in abutment with the washer end surface 28 so that the two surfaces 23 and 28 are rotatable relative to each other, and there may be lubricant between the two surfaces 23 and 28 so that there is only a minimum of friction between the bushing 11 and the thrust washer 24 and thus the two can rotate relative to each other in the normal articulation of the track chain.

The ring 27 of course completely surrounds the bushing outer circumference in an endless form, just as the washer 24 completely surrounds the outer circumference of the pin 10 and is in an endless cylindrical form. The ring 27 is of an angulated cross-sectional shape to have one leg designated 29 extending along the outer circumference of the bushing 11, and having another leg 31 extending transverse to the longitudinal axis of the bushing 11. Also, the ring 27 is press-fitted onto the bushing 11 to be fixedly disposed thereon and of course to be sealed therewith and to be dirt-free and lubricant-tight therewith along the mating surfaces designated by the line 32.

Finally, the seal 19 has its elastomeric member 26 of a cylindrical shape, as best shown in the unassembled or free-body position of FIG. 2, and the elastomeric member end 33 is affixed to the washer 24, and the other end 34 of the elastomeric member 26 is affixed to the ring 27. Also, as best seen in FIG. 2, the longitudinal extent of the elastomeric member 26 is at least twice the thickness of the wall of the elastomeric member 26 which is of a cylindrical or tubular shape, and, as such, the elastomeric member 26 is resilient and flexible, and it is capable of withstanding torsional forces acting on the opposite ends 33 and 34, as induced by the washer 24, and the ring 27, both of which rotate along with the rotation of the pin 10 and the bushing 11, respectively. That is, the pin 10 and bushing 11 may rotate at a relative angle up to say 25° therebetween, and the elastomeric member 26 is capable of torsional deflection without deterioration or damage, and it is therefore recoverable from the torsional deflection described and will recover to its original condition and position. Still further, it will be seen in the assembly views of FIGS. 1 and 3, that the elastomeric member 26 extends from the pin 10 and to the bushing 11, and, in that extent, it extends across the plane of the bushing end surface 23. Therefore, the seal 19 sealed between the pin 10 and bushing 11, for the purposes mentioned.

FIGS. 1 and 3 also show that the washer 24 is disposed as a thrust washer, and an endless cylindrical portion 36 of the elastomeric member 26 extends along the face 37 of the washer 24 and is in abutment with the base surface 38 of the counterbore designated 38 in the link 17. Therefore, the link 17 and the bushing 11 utilize the thrust washer 24 and the elastomeric portion 36 for thrust between the bushing 11 and the link 17. Further, all of the embodiments show an elastomeric portion, such as the endless circular portion designated 41 in FIG. 3, in contact with the outer circumference of the bushing 11 and to be in sealing contact therewith. In FIG. 1, the links 14 and 17 are further spaced apart than they are in FIG. 3, and this also means that the ring 27 in FIG. 1 is closer to the bushing end surface 23 than it is in FIG. 3. Accordingly, the positioning between the links 14 and 17 is not critical relative to the utilization of the seal 19 of this invention, but, additionally, the seal 19 can be positioned to accommodate different spacings between the links 14 and 17, as desired. Also, in the spacing arrangement in FIG. 1, the elastomeric member 26 has its outer surface in contact with the circular and end walls of the counterbore in the link 17, to be in sealing relation therewith, if desired.

In all embodiments shown, there is the utilization of an elastomeric member, such as the member 26, and it is preferrably of a molded urethane material, and FIGS. 4 and 5 show other embodiments of a seal effective for sealing the joint between the outer circumference of the pin 10 and the inner circumference bushing 11. Thus, in FIG. 4, there is a seal 42 which comprises the thrust washer 43 and the elastomeric cylindrically-shaped member 44 and the ring 46. In FIG. 5, there is a seal 47 which comprises the thrust washer 48 and the elastomeric member 49 and the ring 51. In all instances, the elastomeric members are of cylindrical shape and are capable of being distorted under torsional forces, such as mentioned above, and the various thrust washers are pressed onto the pin 10, and the various rings are pressed onto the outer circumference of the bushing 11. Of course the three parts described for each of the respective three seals are suitably affixed together, such as by bonding or by adhesion, and the elastomeric members seal across the plane of the end surface 23 of the bushing 11, as mentioned above. Further, the ring 46 of FIG. 4 is of a slightly different angulated configuration compared to the ring 27 of FIGS. 1 and 3, but the function is substantially the same, except that the ring 46 is shown to be in contact with the end surface 52 of the link 14, and, as such, there can be sealing along the surface 52 when the link 14 is against the ring 46 which in turn is press-fitted and thus affixed to the bushing 11. FIG. 5 shows the link 17 to be of a slightly different configuration, and, as such, it accommodates an angulated portion 53 of the elastomeric member 49 which thus extends directly between the bushing 11 and the end surface of the link 14. Also, the ring 51 is of a shape somewhat different from the ring 27, but it is pressed onto the bushing 11 and is fitted into a counterbore in the link 17, all as shown in FIG. 5.

In all instances, the washers described are thrust washers, and there is therefore sliding contact between the bushing end 23 and the thrust washers utilized in each instance. Accordingly, it is significant and important that the area of contact be free from dirt and that lubricant be maintained therein, and thus the respective seals serve that purpose and are therefore important. Further, due to the resilience and elasticity of the respective elastomeric members, the respective seals can accommodate the movement between the parts, as described, and they can also accommodate the various positioning of the parts relative to each other, such as the axial movement therebetween, as well as the eccentric movement, all in addition to the rotational movement between the pin 10 and the bushing 11, as mentioned.

Accordingly, the chain link members 14 and 17 are respectively press-fitted onto the bushing 11 and the pin 10 and they are spaced apart on opposite sides of the bushing end surface 23. Then there is a seal which extends between the pin 10 and the bushing 11 and across the bushing end surface 23, all as explained and described in connection with the several embodiments shown herein.

What is claimed is:

1. A sealed track chain joint comprising a track pin, a cylindrical bushing extending over the intermediate length of said pin and being rotatable thereon and with said pin having its axial end extending beyond the axial end surface of said bushing, a chain link member on said pin axial end spaced from said bushing end surface, a chain link member on the axial end of said bushing and spaced from said end surface whereby said chain link members are disposed to be spaced apart on opposite sides of the plane of said bushing end surface, a washer on said pin and disposed between said end surface and said link member on said pin and being in sealing relation with said pin, and a seal including an elastomeric member attached to said washer and extending therefrom and across the plane of said bushing end surface and to the outer diameter of said bushing and being in sealing relation with said washer and said bushing for presenting an elastomeric seal for said intermediate length of said pin and said bushing.

2. The sealed track chain joint as claimed in claim 1, wherein said link members are respectively press-fitted onto said pin and said bushing, and said washer is press-fitted onto said pin to be fixed thereon and dirt and lubricant sealed therewith.

3. The sealed track chain joint as claimed in claim 1, wherein said seal includes a circular ring attached to said elastomeric member and is press-fitted onto said bushing to be fixed thereon and dirt and lubricant sealed therewith.

4. The sealed track chain joint as claimed in claim 2, wherein said seal includes a circular ring attached to said elastomeric member and is press-fitted onto said bushing to be fixed thereon and dirt and lubricant sealed therewith.

5. The sealed track chain joint as claimed in claim 2, wherein said bushing end surface is in rotational abutment with said washer which serves as a thrust washer to said bushing, and said elastomeric member is affixed relative to said bushing to thereby seal the joint between said bushing end surface and said thrust washer.

6. The sealed track chain joint as claimed in claim 1, wherein said elastomeric member is of a cylindrical shape having an axial length at least twice the thickness of its shape, to be capable of recoverable torsional twist to accommodate relative rotational movement of said pin and said bushing about their common longitudinal axis.

7. The sealed track chain joint as claimed in claim 6, wherein said washer is fixedly attached to one axial end of said cylindrically-shaped elastomeric member, and a circular ring fixedly attached to the other end of said cylindrically-shaped elastomeric member, and said ring being press-fitted onto said bushing to be fixedly attached thereto and be sealed therewith.

8. The sealed track chain joint as claimed in claim 7, wherein said link members are respectively press-fitted onto said pin and said bushing, and said washer is press-fitted onto said pin to be fixed thereon and dirt and lubricant sealed therewith.

9. The sealed track chain joint as claimed in claim 7, wherein said bushing end surface is in rotational abutment with said washer which serves as a thrust washer to said bushing.

* * * * *